Patented Jan. 6, 1942

2,269,146

UNITED STATES PATENT OFFICE 2,269,146

REMOVAL OF FILTER DYES FROM COLOR FILMS

Le Roy M. Dearing, Rochester, N. Y., assignor to Eastman Kodak Company, Rochester, N. Y., a corporation of New Jersey No Drawing. Application November 22, 1939, Serial No. 305,749

3 Claims. (Cl. 95—2)

This invention relates to color photography and particularly to a method for removing filter dyes from photographic color film.

In the production of color film consisting of two or more differently sensitized superposed emulsion layers such as three superposed layers sensitized to the primary colors, it is generally essential that the blue light which strikes the film during exposure be prevented from reaching the red and green sensitized emulsion layers. This may be accomplished by using an interlayer of gelatin dyed yellow between the blue sensitive and the lower red and green sensitive emulsion layers or a yellow dye may be incorporated in the blue sensitive emulsion layer to prevent the major part of the blue light from penetrating the other layers.

This yellow filter layer is generally used during exposure of the film only, although it may be used during processing to prevent exposure of the lower layers to blue light. It is generally removed during processing so that the finished film reproduces colors in the proper manner. The complete removal of these filter dyes is sometimes difficult. Frequently the filter dyes cannot be removed without damaging the sensitivity of the emulsion layers which remain to be processed or without removing all or part of the processed image dyes which are to form the final colored image. In some processes of color photography, it is desirable to form all of the final image dyes before the yellow filter dye is removed and difficulty of removal of the filter dye is, therefore, a serious objection.

A type of filter dye which has many desirable properties is the aldehyde-containing dye disclosed in Mannes and Godowsky U. S. Patent 2,078,398, April 27, 1937. Dyes of this type do not wash out of the layer readily in water. However, these dyes are difficult to remove from the film after the image dyes have been formed in the emulsion layers. In the process referred to in U. S. Patent 2,078,398, the filter dye is removed before image dyes are formed in the film and there is, therefore, no objection to using a strong oxidizing bath for removal of the filter dye. However, where it is desirable to form some or all of the image dyes before removal of the filter dye a bath of this type cannot be used. The image dyes described in U. S. Patent 2,078,398 are formed by coupling the development product of a primary aromatic amino developing agent with a compound having a reactive methylene or phenolic hydroxyl group forming indophenol, indaniline, and azo-methine dyes.

It is, therefore, the principal object of the present invention to provide a method for removing aldehyde filter dyes from photographic film without damaging image-forming dyes which the film contains or without destroying the color sensitivity of color-sensitive layer of the film. Other objects will appear from the following description of my invention.

These objects are accomplished by treating the film containing the filter dye at any stage after exposure with an aqueous solution of an alkali bisulfite, such as sodium bisulfite, and an organic solvent such as methyl, ethyl or propyl alcohol.

This invention followed from the reasoning that to remove aldehyde dyes successfully without destroying the image dyes in the film, it is necessary first to replace the aldehyde group which has combined with the gelatin with some solubilizing group and second to include some solvent which, after proper dilution with water, will dissolve the dye now in the converted form. The aldehyde group may be replaced with bisulfite to form a water-soluble compound and the dye in the aldehyde-bisulfite form may then be dissolved in water containing some solvent which will not dissolve the image-forming dyes.

A typical formula which involves these principles would contain an alkali bisulfite, especially an alkali metal bisulfite, such as potassium, ammonium, or sodium bisulfite, water and a solvent such as methyl, ethyl, propyl or isopropyl alcohols, acetone, dioxane, or any other solvent which is readily miscible with water. The final choice of solvent will depend upon the nature of solubility of the image dyes as well as the solubility of the filter dye used. This formula may contain up to 900 cc. of water and up to 900 cc. of the water miscible solvent in a total volume of one liter. To this may be added up to 200 grams of sodium bisulfite.

The following formulae, which are illustrative only, indicate solutions which may be used to dissolve and remove aldehyde filter dyes from photographic film according to my invention:

1. Water _____cc__ 500
   Sodium bisulfite _____grams__ 100
   Isopropyl alcohol _____cc__ 500
2. Water _____cc__ 300
   Sodium bisulfite _____grams__ 50
   Isopropyl alcohol _____cc__ 800
3. Water _____cc__ 700
   Sodium bisulfite _____grams__ 200
   Isopropyl alcohol _____cc__ 300
4. Water _____cc__ 650
   Sodium bisulfite _____grams__ 200
   Isopropyl alcohol _____cc__ 350

The dyes used in filter layers are generally aldehyde azo dyes used to absorb blue light rays. However, dyes absorbing light of other colors and aldehyde dyes other than azo dyes, such as those disclosed in U. S. Patent 2,078,398, may be removed according to my invention. In addition to their use in filter layers, aldehyde dyes used as overcoating and backing dyes may also be removed according to my invention.

I consider as included within my invention all modifications and equivalents coming within the scope of the appended claims.

I claim:

1. The method of removing a filter dye containing an aldehyde group from a photographic film containing image dyes selected from the class consisting of indophenol, indaniline and azomethine dyes, which comprises dissolving the filter dye in a solution of sodium bisulfite and a fatty alcohol without affecting said image dyes.

2. The method of removing an azo filter dye containing an aldehyde group from a photographic film containing image dyes selected from the class consisting of indophenol, indaniline and azomethine dyes, which comprises dissolving the filter dye in a solution of sodium bisulfite and ethyl alcohol without affecting said image dyes.

3. The method of removing an aldehyde-azo filter dye from a multi-layer photographic film having therein a picture image composed of a non-aldehyde dye selected from the class consisting of indophenol, indaniline and azomethine dyes, which comprises dissolving the filter dye in an aqueous solution of sodium bisulfite and a lower fatty alcohol without affecting said image dyes.

LE ROY M. DEARING.